Dec. 19, 1933.    R. J. SWEET    1,940,108
FLYING MACHINE
Filed Aug. 20, 1929    7 Sheets-Sheet 2

INVENTOR
Roger J. Sweet

Dec. 19, 1933.     R. J. SWEET     1,940,108
FLYING MACHINE
Filed Aug. 20, 1929     7 Sheets-Sheet 3

INVENTOR
Roger J. Sweet

Dec. 19, 1933.    R. J. SWEET    1,940,108
FLYING MACHINE
Filed Aug. 20, 1929    7 Sheets-Sheet 5

INVENTOR
Roger J. Sweet

Dec. 19, 1933.                R. J. SWEET                1,940,108
                             FLYING MACHINE
                          Filed Aug. 20, 1929            7 Sheets-Sheet 6

INVENTOR
Roger J. Sweet

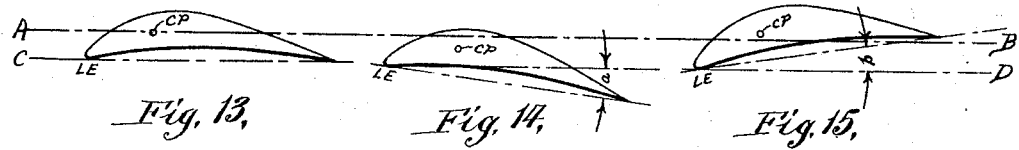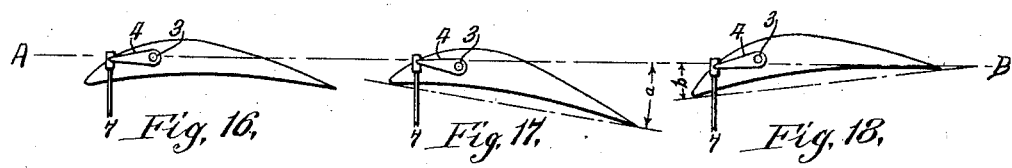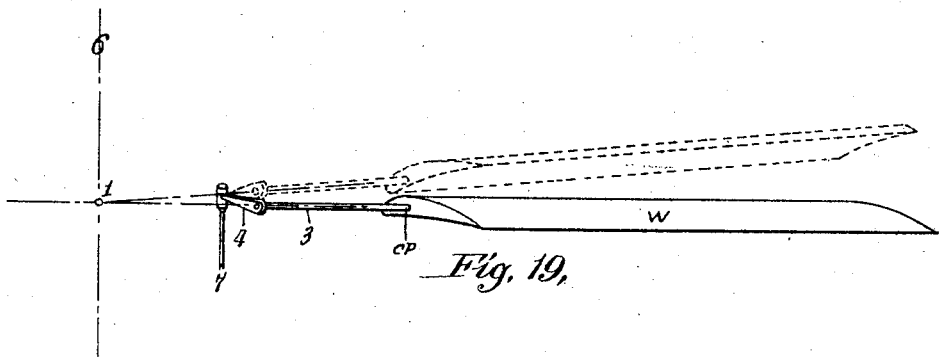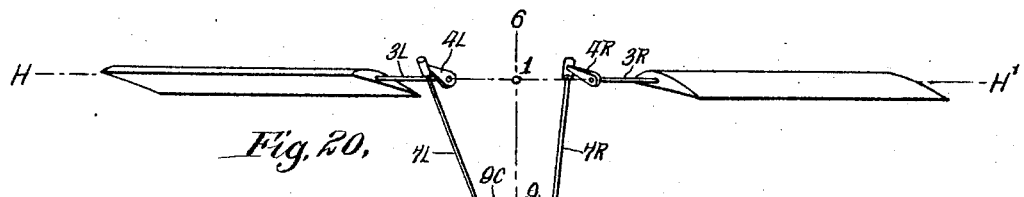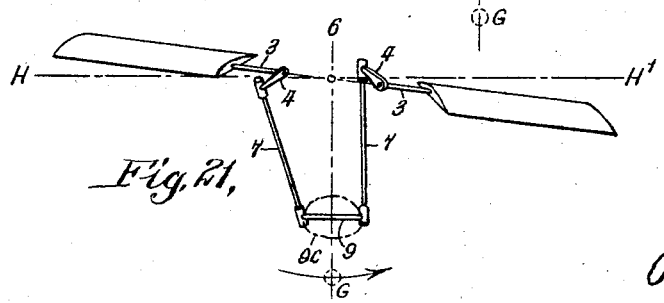

Patented Dec. 19, 1933

1,940,108

UNITED STATES PATENT OFFICE 1,940,108

FLYING MACHINE

Roger J. Sweet, Buffalo, N. Y.

Application August 20, 1929. Serial No. 387,128

12 Claims. (Cl. 244—19)

This invention relates to heavier than air flying machines, and especially to helicopters and the control thereof.

The object of this invention is to provide a simple means of controlling single axis flying machines using revolving wings, such as co-axial helicopters. The invention combines an automatic balancing system with a hand control system to produce an automatic control system that will hold the machine to a set angle of flight and permit the operator to drive the machine without constantly manipulating the controls to balance the machine.

In the accompanying drawings, diagrams and sketches I have tried to clearly show the principles and constructions of my invention with the least confusion. Duplicate and the same parts bear the same number. Similar parts have similar numbers. Where one number is mentioned twice and shown once, the other a duplicate is on the other side of the machine. Since the invention concerns only the control of a helicopter no attempt is made to show a complete machine. However, Fig. 1 shows a side view of the invention as it would appear when installed in a complete machine. The invention consists of the rotatable propeller blades 3, 3, 3', 3' mounted in the swinging hub frames 2, 2, 2', 2', the rotation of the blades being automatically caused by the movement of the swinging hub frames, and manually caused by the control levers 8 and 12.

Fig. 2 shows a plan view of the upper propeller assembly with one blade partly removed to show the quick detachable blade feature. These blades have hollow round beams that are filled with compressed air, the air serves to brace the beam and to indicate a crack by showing loss of pressure on the gauge "g". Fig. 2 also shows the combination crank arm hub assemblies 4, 4, and how they are mounted in the swinging hub frames 2, 2.

Fig. 3 shows a section of one of the crank hub assemblies, section being taken on the center lines of the hub and the crank arm. It shows the tapered roller bearing "R. B." that centers the hub and resists the centrifugal pull of the blade.

Figs. 13 to 21 show the principles of the automatic balance and the full load pilot pendulum.

Figure 1:
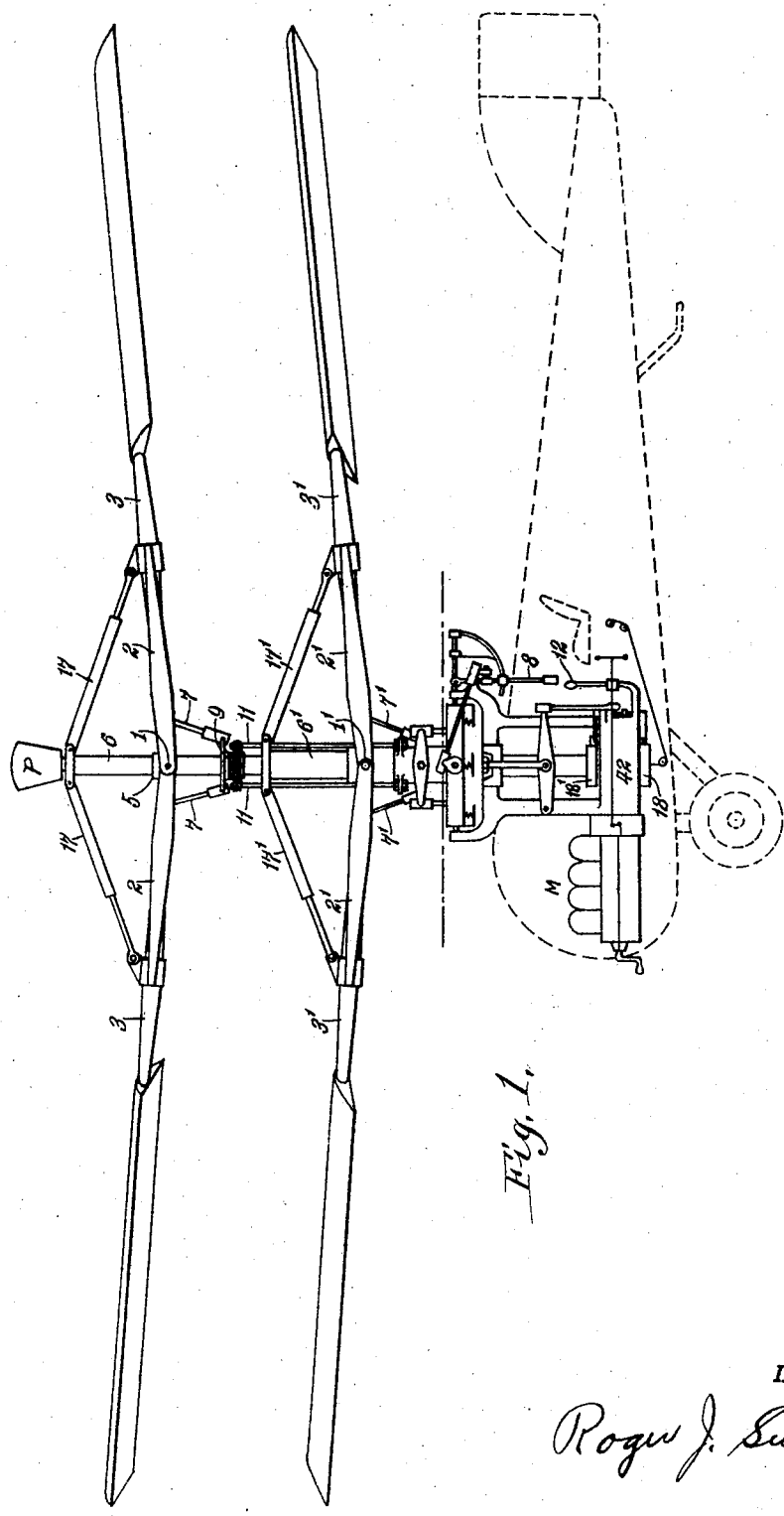
Figure 2:
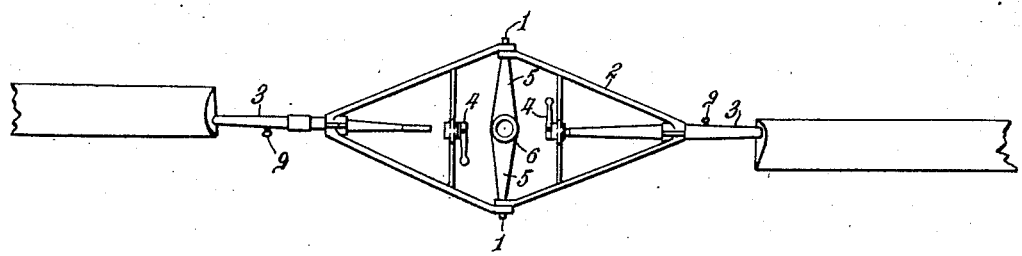
Figure 3:
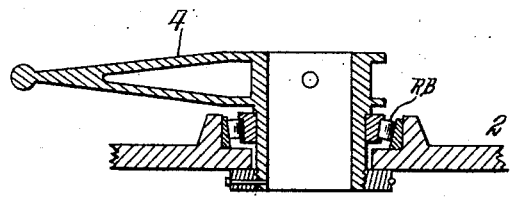

Referring again to Fig. 1, it will be noted that the invention is intended to be used in machines having revolving lifting surfaces, such as shown. The drawings show a machine with two co-axial lift propellers that revolve in opposite directions. The invention is applicable to machines having only one propeller, since each propeller can operate independently of the other. The invention does not require the propellers to be power driven for in "dead engine landing" the pitch is reversed by the lever 12 and the propellers turn as windmills. The machine is driven by a motor "M", the power passing in to the gear box 42, where the speed is reduced and the power divided to drive the two propeller shafts 6, 6', one turning opposite to the other. Immediately above the gear box and fastened to the outer shaft 6' is the right turn brake drum 18' of the swinging gear and just below the gear box, fastened to an extension of shaft 6 is the left turn brake drum 18, which can be compressed by moving the rudder bar. The upper and lower propeller assemblies are attached to their respective shafts by means of hub arms shown at 5, 5, Fig. 2, the lower propeller being similar to the upper. At the ends of the hub arms 5, 5 are the load pivots 1, 1 on which the swinging hub frames are free to move up and down, or, as occurs in flight, the non-rotating parts can swing as a pendulum, Fig. 1. At the top of the machine is the parachute container "P" which is controlled by a cable through the hollow shafts to the release ring by the operator's seat. The swinging hub frames 2, 2, 2', and 2' that support the blades 3, 3, 3', 3', are held from falling down by the check rods 17, 17, 17', 17' that also serve to prevent the upper blades from striking the lower and have a shock absorber effect. These rods permit the blades to rise and fall a certain amount so that they can balance their upward thrust against the centrifugal force. The principle of automatic balance, however, was discovered with a double hub, or with the opposite swing frames 2, 2, fastened together. The separate swing frame was adopted because it permitted a shock absorber effect. The pivots 1, 1, 1' 1' drive the swing frames 2, 2, 2', 2' and they in turn drive the blades. In operation the motor turns the blades and as they revolve, they develop an upward thrust due to the pitch which is controlled by the lever 12. With the tilt lever 8 in neutral position the machine rises vertically, the entire weight of the non-rotating parts acting as a pilot pendulum to hold the common shaft axis vertical. Now the tilt lever 8 can be pressed forward and the machine will move forward, the pendulum action automatically maintaining the lateral stability. The tilt lever 8 can be locked in a forward position and the pendulum action will maintain a compromise degree of tilt. The operator can then steer the machine like a boat and only needs to watch the altitude which can be varied with the engine throttle. Should the engine go dead, the clutch "C" is thrown out and the pitch reversed by lever 12, then both propellers turn as wind mills with their individual blades acting as planes in a spiral dive. The machine may descend vertically or at an angle, like an aeroplane. All features of the invention function the same and all levers operate the same as though the power was on.

Having described the construction and operation of my invention in a general way I will now describe the features separately as I feel they may be more easily understood.

The automatic balancing feature or the full load pilot pendulum depends for its action on the fact that the force of gravity is constant and that the center of gravity will always seek a position in a vertical line below the center of support regardless of the distance between the centers. This fact is old and in common use to automatically balance boats, balloons, parachutes etc. At short centers this force becomes feeble and is useless if used directly but I have discovered a way to use it indirectly or as a pilot and in order to get the smoothest action and the quickest action I have increased the power of center of gravity by using the entire weight of the non-rotating parts. The means for accomplishing this pendulum action are very simple in their perfected state. Now refer to Figs. 13 to 21.

Fig. 13 shows a simple wing section with its leading edge LE touching the line CD and the line AB passing through its center of pressure CP, there being no angle of incidence. Fig. 14 shows the effect of lowering CP and holding LE, climbing angle "a" is produced. Fig. 15 shows the effect of raising CP and holding LE, diving angle "b" is produced. Fig. 16 shows a similar wing section but with a shaft 3 through its center of pressure, a crank arm 4 attached to the shaft 3 and a control rod 7 attached to the end of the arm 4. The line "AB" passes through the rod coupling center and the center of shaft 3, there is no angle of incidence. Fig. 17 shows the effect of lowering the shaft and holding the rod end, climbing angle "a" is produced. Fig. 18 shows that a diving angle "b" is produced when the shaft is raised. Fig. 19 shows a wing "W" having a shaft 3 through its center of pressure, a crank arm 4 attached to the shaft and a rod 7 coupled to the arm. Now if the wing is raised, and a hub frame pivoted at 1 on the shaft axis 6, guides the wing shaft axis to swing about 1 as a center and the rod 7 is held, then the wing will assume a diving angle as shown by the dotted lines. Should the end of the wing be lowered a climbing angle would be produced as shown in Figs. 15, 18. Fig. 20 shows two such wings arranged to revolve about the axis 6, the center lines of the wing shafts 3L, 3R held to the same line by a double swing frame pivoted at 1, as was used on the model and shown here to avoid confusion, swing frame being indicated on drawings by line through wing shaft centers. The control rods 7L, 7R are coupled to the cross head 9 which is fastened to the propeller shaft 6, indicated by its axis in the drawings. Now if the wings are revolved about the axis 6 they become propeller blades, and their angle of incidence depends on the crank arms 4, 4, the length of the rods 7, 7, and the position of the cross head 9. With 9 at right angles to 6 and all rods, arms etc. equal, the blades will have equal pitch when their plane of rotation is at right angles to 6. When 6 is vertical the center of gravity of the non-rotating parts "G" will not attempt to move, the ends of the cross head 9 will describe a circle in a horizontal plane and the blades will turn in a horizontal plane. Should, for any reason the blade shown at the right in Fig. 21 be lowered a downward pressure is put on the rod 7R, this pressure is transmitted through the cross head 9 and the shaft 6 to "G", and tends to swing "G" to the left, but "G" offers a powerful resistance, and since the only force that can be put on 7R is that necessary to rotate the blade, which is small, "G" yields but little and the blade is rotated to assume a climbing angle, in a similar but opposite way the left blade is rotated to assume a diving angle.

Thus it follows that when a blade is lowered it is rotated to assume a climbing angle and when it is raised it is rotated to assume a diving angle. This condition is automatic and depends on the fact that the cross head 9, held, more or less, horizontal on the ground by the landing gear, and urged to the horizontal by "G" in the air, establishes a parallel plane by means of the upper end of the equal rods 7, 7, and only in this, or a parallel plane can the pitch angles of the blades be equal, the blades being so connected that they will both seek the same plane of rotation, and balance each other. "G" seeks a vertical position below 1 the center of support and moves 9 which controls the plane of blade rotation, therefore "G" is the pilot directing the controls and to give it unquestionable power it was made the full load pilot pendulum hand tilt control.

It has been shown how the machine automatically "plumbs" itself. It has also been shown that the propeller blades seek a plane of flight parallel to the plane of rotation of the cross head couplings to the control rods 7, 7, or the circle 9C. Now if means can be provided to control the plane of 9C, the equal pitch plane of the blades can be controlled. This is done by means of the hand control which is only applied to the lower propeller, that has ample power to tilt the main axis 6. The plane of the upper propeller being held automatically square to the axis 6 by pilot action follows Therefore the hand lever 8 controls the lower propeller as a pilot and the lower propeller moves the main axis 6 which acts as a pilot to control the upper propeller. But the hand lever 8 acts with "G" as a fulcrum and "G" opposes any tilt with increasing force. Therefore the machine tilts under the influence of the lever 8 against increasing resistance from "G" and a point is reached where a balance is struck. If the tilt lever is locked, a uniform degree of tilt will be automatically maintained. A means is provided to automatically center the hand lever 8 when it is released. This removes opposition to "G" which plumbs the machine.

Figure 6:
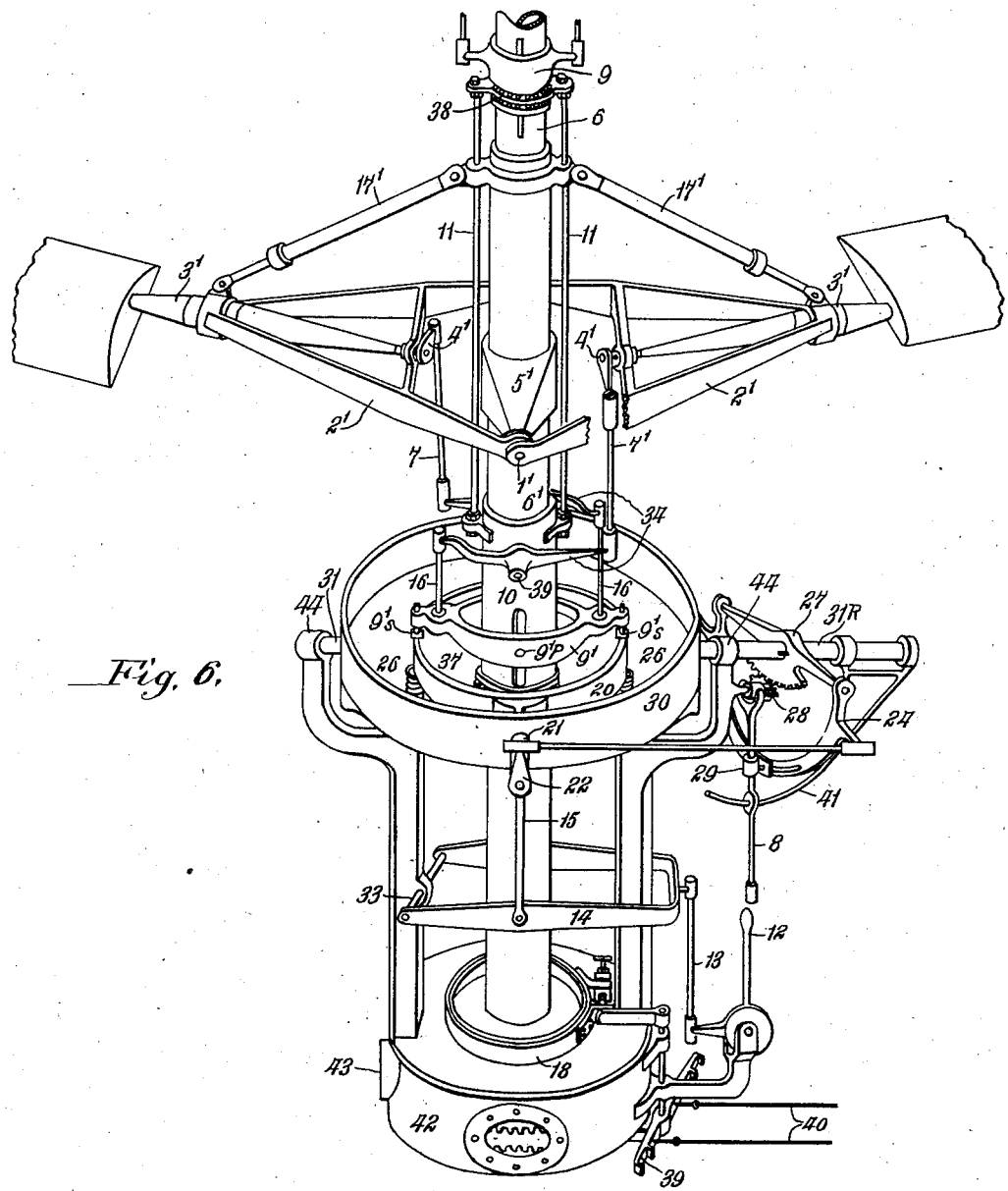
Fig. 6 shows a compromise side view of the assembled features. The upper propeller assembly is not shown, it being similar to the lower but of opposite hand.
Figure 7:
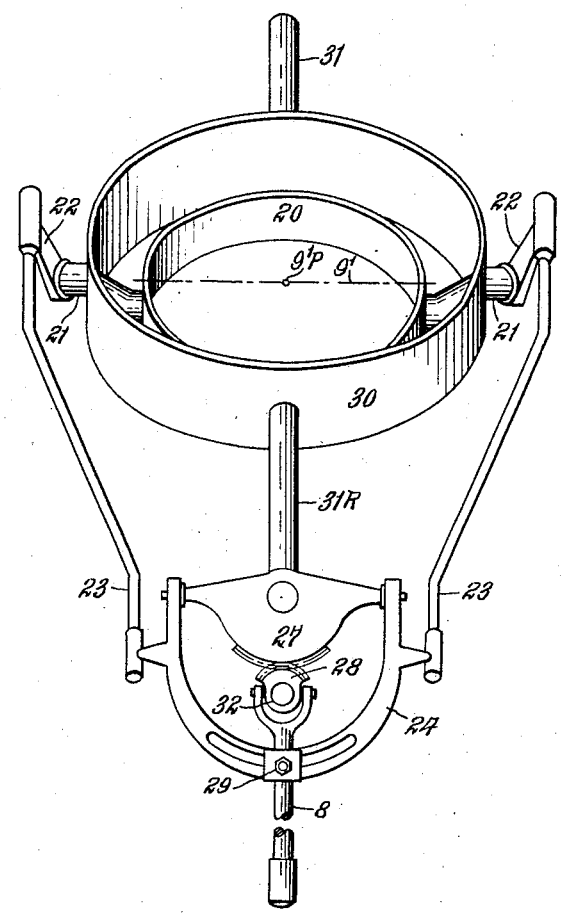
Figs. 7 to 12 show the hand lever 8 or tilt lever and its connections to the blades.

The hand control is made possible by pivoting the lower cross head 9' to the outer main shaft 6' with pivots approximately parallel to the load pivots 1', 1' as shown in the sketch Fig. 6 and in diagram in Fig. 7. The cross head 9' is free to rock on its pivots but it is restrained by the gimbal mounted control ring 20, the upper surface of which forms a control plane in which the center lines of all pivots lie.

Figure 11:
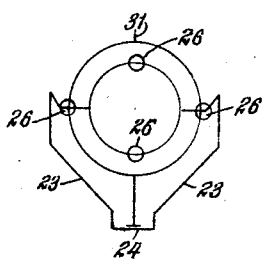
Figure 12:
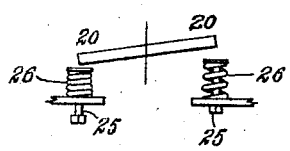

The cross head 9' is provided with adjustable shoes 9'S that bear lightly on the upper surface of the ring 20. It now follows that as the shaft 6' revolves and cross head 9' turns with it the shoes follow the surface of 20. The ring 20 is held square to the shaft 6' by four adjustable checked springs 26, 26, 26, 26, Fig. 11. These springs force the ring 20 to a position square with the shaft but are checked by the bolts 25, as shown in Fig. 12, from passing the center position. When the ring 20 is in the neutral position or square to the shaft 6', the cross head 9' will be held square to the shaft throughout its full revolution. The ring 20 is arranged with the center lines of its gimbal shafts intersecting at the common shaft center 6, and lying in the plane of the upper surface of the inner ring or control plane. The cross head pivots 9'P also lie in this plane. This construction provides a constant clearance between the cross head shoes 9'S and the ring 20, regardless of position, Fig. 6.

Figure 9:
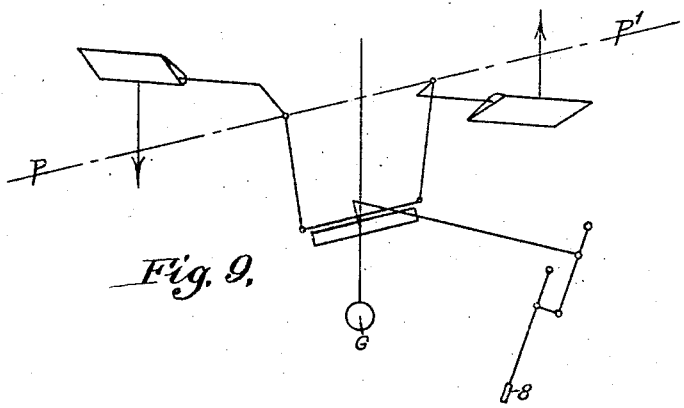

The inner or control ring 20, Fig. 7, is supported by shafts 21, 21 welded to it and turning in bearings in the outer ring 30, on the ends of these shafts are the arms 22, 22 rigidly fastened. The arms are coupled to the frame lever 24 by the rods 23, 23, the frame lever 24 is coupled to the hand lever 8 by a small combination link block and sleeve 29. The sleeve slides freely on the shaft of lever 8, and the flanged link block can slide in the slot of the frame lever 24. This combination provides a flexible connection and permits the lever 8 to move the frame lever 24 longitudinally and thereby operate the inner ring 20 by means of rods 23, 23 as shown in Fig. 9. The construction provides means of reducing the angular movement of 20 with respect to 8, by means of lever ratio.

Figure 10:
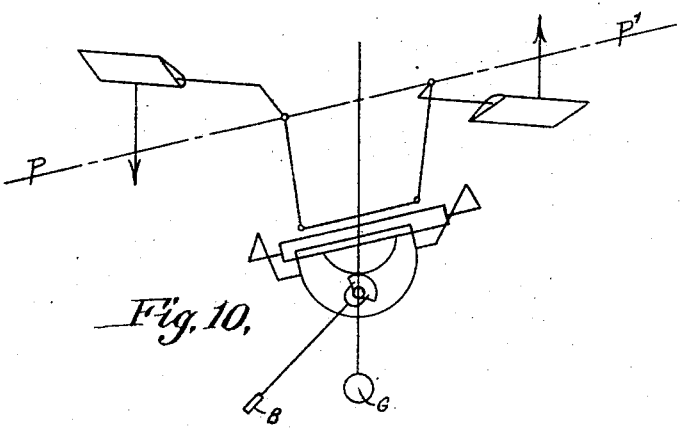

The outer ring 30 supports the inner ring 20 and in turn is supported by shafts 31, 31R, welded to it and turning in bearings 44, 44 in the main frame as shown in Fig. 6. The rear shaft or 31R is extended and has the combination cross head and gear sector 27 keyed to it. The arms of 27 support 24. 31R also carries the friction lock sector 41. Directly below the shaft 31R is the stub shaft 32 that supports the pinion sector 28 which is free to turn on it. The pinion sector is provided with two lateral pivots on which the lever 8 is free to swing fore and aft by means of the yoke at its upper end. Lateral movement of the lever 8 moves the pinion sector 28, which, meshing with the gear sector 27, turns the outer ring 30, by means of shaft 31R, and thereby moves the control ring 20 as shown in Fig. 10. This construction provides for reducing the angular movement of 20 with respect to 8, by means of gear ratio.

Figure 8:
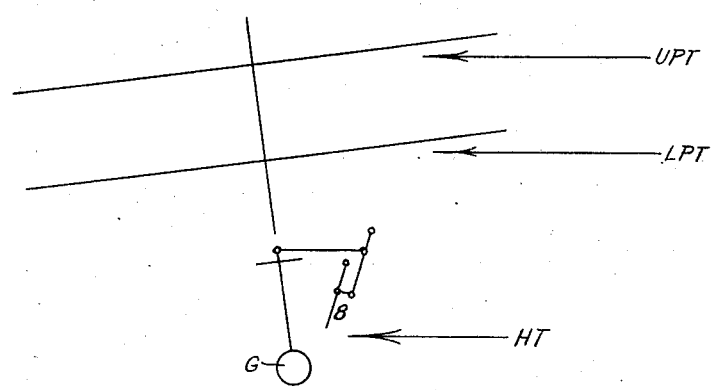

The construction is arranged so that the control plane will operate the propeller blades to tilt the machine the same direction that the lever 8 is moved, as shown in Figs. 9, 10. The blades seek the parallel plane PP' as determined by the control plane, a forward hand thrust Fig. 8 H. T. produces a forward lower propeller thrust LPT, this tilts the axis 6 forward causing the upper propeller to deliver a forward thrust U. P. T. "G" is pulled forward by the advanced pivots.

Should the hand lever 8 be released, "G" would move forward and plumb the machine. This movement is possible in any direction, with or without power.

To steady the machine and reduce the effort required to hold the machine to a set course a vertical rudder and a means to lock 8 in the forward motion are provided. The locking device shown consists of a simple sector bar 41 Fig. 6 that passes through a hole in an enlargement of the lever 8 and a screw operated by a hand grip is arranged to pinch the bar with a friction block.

With the lever 8 locked in the forward motion position and the hand removed "G" yields to the compromise degree of forward tilt determined by the hand tilt lever 8, but being unopposed laterally maintains the axis 6 in a vertical plane of flight automatically. Should a turn be made, "G" swings to the line of compromise between gravity and centrifugal force and this produces automatic "banking".

It has been shown how the full load pilot pendulum plumbs the machine, and how the hand tilt lever 8 can tilt the machine in any direction, but with these alone the control would not be complete. There still must be means to climb with power on and glide with power off as well as means for turning the machine about its own axis 6.

Figure 4:
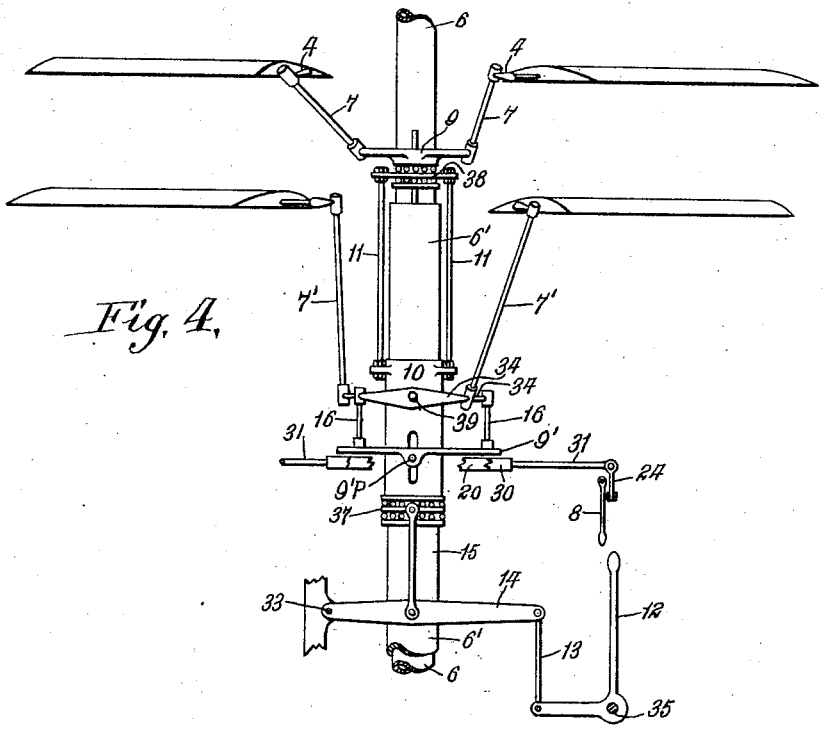
Fig. 4 shows a side view of mechanism whereby the pitch of both propellers is controlled by the hand lever 12. This view shows the "neutral" or no angle position of the blades.
Figure 5:
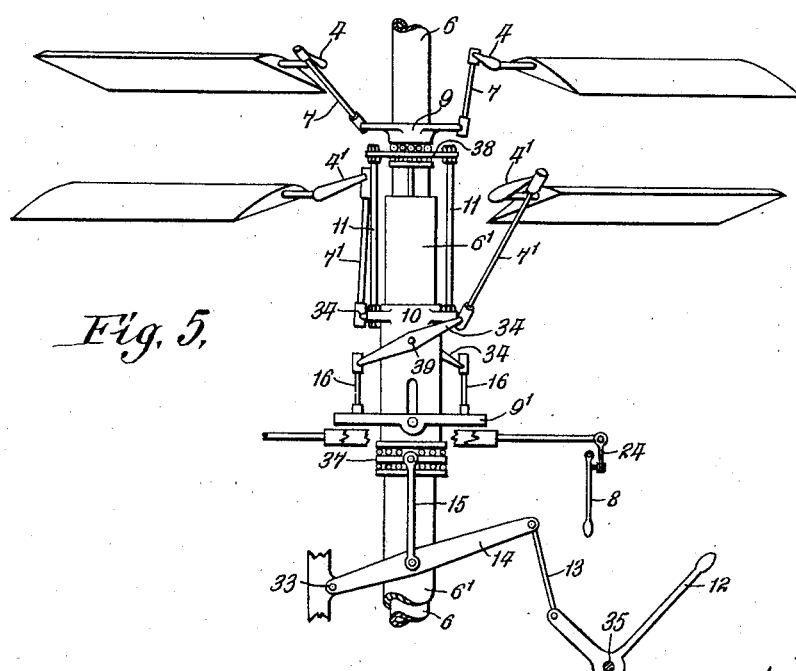
Fig. 5 is similar to Fig. 4 but with the lever 12, and blades in full positive position.

Figs. 4, 5 show the construction and operation of the pitch control system operated by the lever 12. This system is connected with the pilot pendulum and the hand control without interfering with the operation of either. The upper cross head 9 is slidably mounted on a key to the shaft 6. The lower cross head 9' is pivoted to shaft 6', free to rock but guided by the control ring 20 as explained. The upper propeller blades are coupled directly to the upper cross head by the rods 7, 7 but the lower blade rods 7' 7', connected to the lower cross head by means of rocker arms 34, 34, and rods 16, 16. These rocker arms 34, 34, fulcrum on pivots 39, 39 fixed to the slidable, keyed sleeve 10. The sleeve 10 is connected to the upper cross head 9 by means of rods 11, 11 and a suitable thrust collar 38 to provide for the difference in rotation, in a similar way the sleeve 10 is connected to the lever 12 by rod 13, and thrust bearing 37.

The operation is obvious, moving the lever 12 moves the sleeve 10 and cross head 9 and rotates the blades, Fig. 4 shows the "neutral" and Fig. 5 the full positive pitch position.

The turning device consisting of the brake drums 18, 18' mounted on the main frame, is shown in Fig. 6. Movement of the rudder bar 39 first moves the fin rudder control cables 40 and further movement compresses one of the bands. The construction is arranged so that the rudder bar acts as a pilot, moving the machine the way it is moved.

Having described my invention, what I claim as new, and desire to secure by Letters Patent is:—

1. A flying machine comprising a fuselage; a power shaft; means for driving said shaft; a swing frame pivoted transversely on said shaft; a wing rotatably supported by said frame; a crank arm having a hub pivoted to said frame and adapted to rotate said wing about its axis and having the outer end of its arm fixed with respect to said shaft.

2. A flying machine comprising a fuselage; a power shaft, means for driving said shaft; a swing frame pivoted transversely on said shaft;

a wing rotatably supported by said frame; a crank arm having a hub pivoted to said frame and adapted to rotate said wing about its axis; a gimbal ring movably mounted on said fuselage; and means operatively connected with the outer end of said crank arm and actuated by said gimbal ring.

3. A flying machine comprising a fuselage; a power shaft, means for driving said shaft; a swing frame pivoted transversely on said shaft; a wing rotatably supported by said frame; a crank arm having a hub pivoted to said frame and adapted to rotate said wing about its axis; a gimbal ring movably mounted on said fuselage; means operatively connected with the outer end of said crank arm and actuated by said gimbal ring; and means for positioning said gimbal ring at any desired angle with respect to said shaft.

4. A flying machine comprising a fuselage; a power shaft, means for driving said shaft; a swing frame pivoted transversely on said shaft; a wing rotatably supported by said frame; a crank arm having a hub pivoted to said frame and adapted to rotate said wing about its axis; a gimbal ring movably mounted on said fuselage; means operatively connected with the outer end of said crank arm and actuated by said gimbal ring; means for positioning said gimbal ring at any desired angle with respect to said shaft; and means for locking said gimbal ring in any desired position.

5. A flying machine comprising a fuselage; a vertical shaft; a swing frame pivoted transversely on said shaft; a wing rotatably supported by said frame; and a crank having its hub journaled in said swing frame and adapted to rotate said wing so as to change its angle of incidence and having the outer end of its arm fixed with respect to said shaft.

6. A flying machine comprising a fuselage; a vertical shaft; a swing frame pivoted transversely on said shaft; a wing rotatably supported by said frame; and a crank having its hub journaled in said swing frame and adapted to rotate said wing about its center of pressure and having the outer end of its arm fixed with respect to said shaft.

7. A flying machine comprising a fuselage; a supporting shaft vertically journaled thereon; a load pivot connected with said shaft and having its axis perpendicular to and intersecting the axis of said shaft; a swing frame pivoted on said load pivot; a wing movably mounted on said frame in such manner that the centrifugal force exerted by the center of gravity of said wing always intersects the axis of said load pivot; and means for altering the angle of attack of said wing in accordance with the position of said swing frame relatively to said shaft.

8. A flying machine comprising a fuselage; a supporting shaft vertically journaled thereon; a load pivot connected with said shaft and having its axis perpendicular to and intersecting the axis of said shaft; a swing frame pivoted on said load pivot; a wing movably mounted on said frame in such manner that the centrifugal force exerted by the center of gravity of said wing always intersects the axis of said load pivot; and having an angle of attack lying in a plane parallel to the axis of said load pivot; and means for altering said angle of attack in accordance with the position of said swing frame relatively to said shaft.

9. A flying machine comprising a fuselage; a supporting shaft vertically journaled thereon; a load pivot connected with said shaft and having its axis perpendicular to and intersecting the axis of said shaft; a swing frame pivoted on said load pivot; a wing pivoted on a swing frame on an axis which is perpendicular to the axis of said load pivot; and means for turning said wing relatively to said swing frame in accordance with the position of said swing frame relatively to said shaft.

10. A flying machine comprising a fuselage; a supporting shaft vertically journaled thereon; a load pivot connected with said shaft and having its axis perpendicular to and intersecting the axis of said shaft; a swing frame pivoted on said load pivot; a wing movably mounted on said frame in such manner that the centrifugal force exerted by the center of gravity of said wing always intersects the axis of said load pivot; means for altering the angle of attack of said wing in accordance with the position of said wing frame relatively to said shaft; and means limiting the movement of said swing frame relatively to said shaft.

11. A flying machine comprising a fuselage; a supporting shaft vertically journaled thereon; a load pivot connected with said shaft and having its axis perpendicular to and intersecting the axis of said shaft; a swing frame pivoted on said load pivot; a wing movably mounted on said frame in such manner that the centrifugal force exerted by the center of gravity by said wing always intersects the axis of said load pivot; means for altering the angle of attack of said wing in accordance with the position of said wing relatively to said shaft; and means resiliently limiting the movement of said swing frame relatively to said shaft.

12. A flying machine comprising a fuselage; a supporting shaft vertically journaled thereon; a load pivot connected with said shaft and having its axis perpendicular to and intersecting the axis of said shaft; a swing frame pivoted on said load pivot; a wing movably mounted on said frame in such manner that the centrifugal force exerted by the center of gravity of said wing always intersects the axis of said load pivot; means for altering the angle of attack of said wing in accordance with the position of said swing frame relatively to said shaft; and a parachute arranged at the upper end of said shaft.

ROGER J. SWEET.